United States Patent [19]
Klinger

[11] 3,990,439
[45] Nov. 9, 1976

[54] PROTECTIVE BREATHING APPARATUS AND VALVE THEREFOR

[75] Inventor: Guy G. Klinger, Shillington, Pa.
[73] Assignee: ESB Incorporated, Philadelphia, Pa.
[22] Filed: Dec. 5, 1974
[21] Appl. No.: 529,859

[52] U.S. Cl.................... 128/142.4; 128/146.6; 137/854; 251/172; 251/333
[51] Int. Cl.² .................................. A62B 18/02
[58] Field of Search............ 128/140 R, 141, 145.7, 128/146, 146.4–146.7, 142.4; 251/85, 159, 172, 331, 333; 137/525, 525.1

[56] References Cited
UNITED STATES PATENTS

| 1,550,376 | 8/1925 | Longacre | 137/525 |
| 2,051,023 | 8/1936 | Bullard | 128/141 R |
| 2,174,503 | 9/1939 | Whipple | 137/525 |
| 2,588,516 | 3/1952 | Glidden | 128/141 R |
| 2,664,887 | 1/1954 | Green | 128/146.4 |
| 2,996,722 | 8/1961 | Jacobs | 128/141 R |
| 3,220,408 | 11/1945 | Silverberg | 128/141 R |

FOREIGN PATENTS OR APPLICATIONS 1,088,047  10/1967  United Kingdom................ 137/525

Primary Examiner—William E. Kamm
Attorney, Agent, or Firm—Anthony J. Rossi

[57] ABSTRACT

A respirator or gas mask has a check valve having a seat with a raised border. A soft rubber valve is located on the seat and held thereto by a valve retainer. When the valve is not under any pressure, the valve is sealed solely by contact between the rim of the valve and the raised portion of the seat. When back-pressure is placed on the valve, it seats on the entire valve seat area.

7 Claims, 7 Drawing Figures

PROTECTIVE BREATHING APPARATUS AND VALVE THEREFOR

BACKGROUND OF THE INVENTION

1. Field of the Invention

This invention relates to a protective breathing apparatus, specifically, it relates to valves for use with gas masks and respirators.

2. Description of the Prior Art

In many gas masks and respirators, valves are used to direct the flow of air caused by breathing of the user from an intake port and out an exhalation port. In order to reduce the hardship of wearing these protective devices, it is desirable that the valves used be reliable and that they operate on minimum pressure differentials. The pressure to open the exahalation valve has been found to be directly related to the comfort of a wearer, the lowest possible opening pressure being desired. Further, it is both desirable and a safety code requirement that the exhalation valve be completely closed at its rest position. These two requirements are not entirely compatible as a valve that is closed in the rest position tends to be harder to open than one which does not fully close. In general, such valves take the form of a more or less rigid seat and a rubber flap valve cooperating therewith. In the more refined valves, the valve is a disc fastened at its center to the valve seat.

Gas mask and respirator valves are often required to operate in atmospheres of extremely high humidity and they may become covered with condensed moisture. The effect of moisture on a valve is to make it more difficult to open. This is particularly true of valves having an extensive seat area.

Numerous valves are known having designs directed toward the goal of complete closure and minimum opening pressure. One such design embodies a seat having a plurality of seating ridges with valleys in between. In another valve, the valve is molded with a dependent skirt contacting a flat valve seat. Valves are known having curved valve seats. With such valves, it has often been the practice to use a molded valve shaped to conform closely to the seat. In all these valve designs, it has been found that moisture can cause a considerable increase in the opening pressure. This is because in such designs there is a considerable area where water can lodge and hold the valve to the seat by capillary forces.

SUMMARY OF THE INVENTION

A valve assembly for use in a protective breathing apparatus includes a seat member, a valve member and a valve retainer member. A seat, circular in plan, formed in the seat member, includes a flat central portion and a circular concavely shaped outer portion. A soft rubber circular valve disc having a diameter greater than the diameter of the flat portion of the seat and smaller than the border of the raised portion is held to the center of the seat by a valve retainer and centered by an aligning pin formed on the valve seat. Under conditions of no pressure, the edge of the valve disc rests on the raised portion of the valve seat closing the valve. The rest of the valve disc except for the central portion, which is held to the center of the seat by the retainer, is free from contact with the valve seat. When reverse pressure is placed on the valve disc, it is forced into contact with the entire valve seat area. In a preferred seat, the raised portion is the shape of a portion of a circular toroid having the flat central portion of the seat tangent thereto. The valve is especially suited for use with respirators and gas masks.

Because of the peculiar series of stresses placed upon the valve disc, it has been found that for best results it should be made of soft vulcanized natural rubber. Molded rubber sheet has been found to have better properties than calandered sheet.

From this description, it can be seen that the valve disc of the present invention seats, when under no pressure, on its circumferential edge only. This means that the maximum area of the valve is exposed for opening and that the contact between valve disc and seat is limited to the line contact of the edge of the valve disc and the seat. There is a minimum area for condensed moisture to act in holding the valve disc closed. It will also be seen that when sufficient reverse pressure is placed on the valve disc, it conforms to the entire valve seat and is thus provided with additional support to prevent the valve disc from blowing through the air passages in the seat. When the reverse pressure is removed from the valve disc as at the end of a breath, the elastic valve disc has sufficient tension to break the capillary forces of moisture between the valve disc and the central portion of the seat, restoring the valve disc to the original rest position, and ready to be opened by a minimum exhalation pressure.

DESCRIPTION OF THE PREFERRED EMBODIMENT

Figure 1:
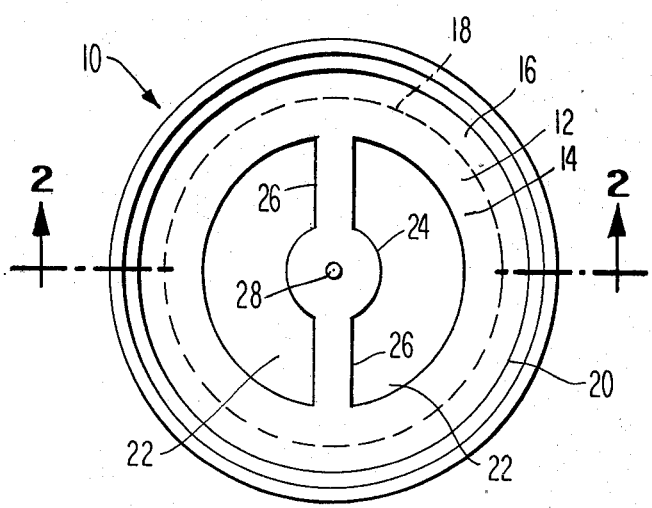
FIG. 1 represents in plan a valve body of the invention.
Figure 2:
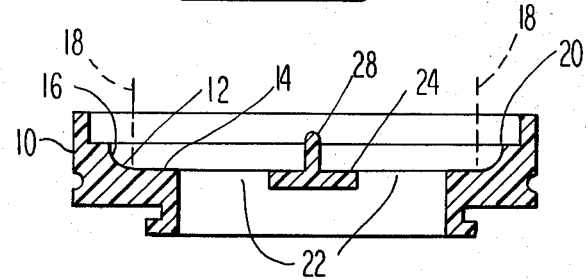
FIG. 2 represents cross section 2—2 of FIG. 1.

In FIGS. 1 and 2, a valve body 10 is shown having a seat 12. For descriptive purposes, the seat 12 can be described as made of two portions, a flat ring shaped inner portion 14 and a circular concavely shaped outer portion 16, the two portions 14 and 16 blending smoothly together. The inner portion has an outside diameter as indicated by the dashed line 18. The outer portion 16 blends into the inner portion and ends at a border 20. The diameter of the border 20 is greater than the outside diameter of the inner portion. The inner portion defines openings such as 22 to allow for passage of air through the valve body.

In a preferred embodiment, the shape of the outer portion 16 of the valve seat is that of a portion of a circular toroid with the flat portion 14 of the seat tangent to the inner portion thereof.

At the center of the valve seat, there is a valve support 24 connected to the ring portion of the valve by a plurality of legs 26. The surface of the valve support 24 and the legs form a continuation of the flat surface of the inner ring shaped portion of the valve seat. At the center of the support 24 on the axis of the valve seat 12, and forming a part of the valve body, an aligning pin 28 is located. The pin extends upward from the seat to slightly above the height of the border 20 of the outer portion of the seat.

Figure 3:
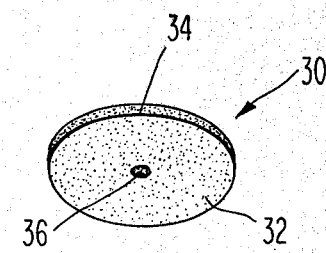
FIG. 3 represents in perspective a valve disc of the invention.
Figure 4:
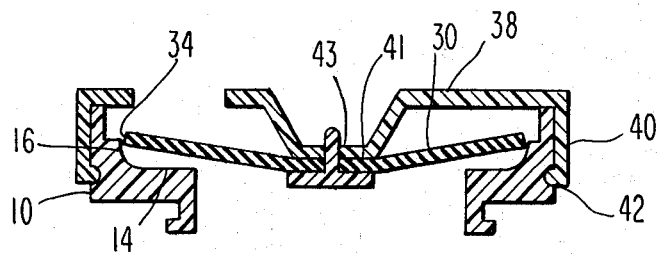
FIG. 4 represents cross section 2—2 of FIG. 1 with a valve disc and a valve retainer assembled thereto.

A circular valve disc 30 made of an elastic material is shown in perspective in FIG. 3. The valve disc has a face 32 and an edge 34. The diameter of the edge is greater than the outside diameter 18 of the flat ring shaped inner portion of the seat but smaller in diameter than the border 20 of the circular concavely shaped outer portion of the valve seat. The valve disc is made by preference from a flat sheet. It is cut therefrom to give a sharp edge at right angles to the face 32 of the sheet. An opening 36 is located in the valve disc on the central axis thereof. The hole is an engaging fit on the aligning pin 28. FIG. 4 shows in cross section the valve body 10, the valve disc 30 and a valve retainer 38, assembled for use.

The opening 36 in the valve disc 30 is located on the aligning pin 28 and is held tightly against the support 24 by the valve retainer 38. The valve retainer 38 has a cylindrical rim 40. The rim positions the retainer in horizontal relationships relative to the valve body by the fit of the rim 40 over the outside of the valve body. The vertical location of the valve retainer is determined by a positioning and locking means such as the snap fit bead and groove shown at 42.

The central disc shaped portion 41 of the retainer is smaller in diameter than the inner edge of the flat portion 14 of the valve seat and is by preference about the same diameter as the valve support 24. A hole 43 formed in the central portion 41 of the retainer and on the axis thereof serves to engage the aligning pin 28 and prevents the valve disc 30 from slipping out of the valve. Because the diameter of the valve disc edge 34 is greater than the diameter of the flat portion 14 of the seat and smaller in diameter than the border 20 of the outer portion 16 of the seat, the edge 34 of the valve disc 30, when at rest, engages the circular concavely shaped outer portion 16 of the seat and is free of contact with the flat inner portion 14 of the seat. In this position, the shape of the valve disc becomes approximately that of a conical frustrum. The contact between valve disc and valve seat is a circular line contact due to the sharp edge of the disc. The angle between the face 32 of the valve and the face of the seat 16 approaches a right angle so that droplets of moisture which may collect will have a minimum of surface on which to accumulate.

Figure 5:
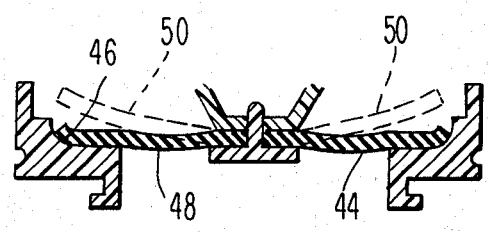
FIG. 5 represents in cross section 2—2 with the valve disc in two additional working positions.

FIG. 5 depicts two additional positions that can be taken by the valve disc. Shown in solid lines at 44, the valve is in the position it assumes when a reverse pressure greater than a first pressure, i.e., of a magnitude sufficient to force the disc against the entire seat, is imposed thereon. As shown, the outer portion 46 of the disc seats upon the full area of the valve seat and conforms to the inner portion 14 and the outer portion 16 of the seat. It is held at the center by support 24 and bulges slightly into the valve openings as shown at 48.

When a forward pressure is placed on the valve, the disc bends upward free of the valve seat as shown in dotted lines 50, opening the valve. In the open position, the position of the valve disc need not be uniform. It may actually be open around parts of its edge and closed around other parts.

It will be seen that the valve disc of the invention requires rather specific properties. It must have sufficient elasticity to cause it to close and seal when in a static condition. When sufficient reverse pressure is placed on it, it must conform to the valve seat without wrinkling. It must have sufficient elasticity to spring back to the rest position when the reverse pressure is removed and break away from the flat seat in spite of moisture and associated capillary forces resulting therefrom. When a forward pressure is placed on the disc, it must open so as to provide a maximum flow with a minimum of pressure drop.

Further, the valve disc must be capable of flexing at a rate of perhaps 900 times per hour for a reasonable lifetime.

In order to achieve these ends, it has been found that valve disc material and valve disc dimensions must be properly coordinated. It has been found that a high quality natural rubber vulcanized to a soft consistency is the most suitable material for the valve disc. In a particular instance, a pure gum rubber having a Shore A durometer reading of $35 \pm 5$ valve disc having a diameter of 29.0 mm and a thickness of 4.0 mm working in a valve seat having a diameter at the border of 29.5 mm fulfills the above requirements for breathing apparatus.

For smaller valves, a thinner disc should be used and for larger valves a thicker one.

Small soft rubber parts are often made by multicavity molding. In contrast to this, it has been found desirable for the present valve disc to mold a flat sheet of rubber and cut the disc therefrom. It has been found that discs made in this manner have better elastic properties than parts made by the multi-cavity process. The operation of cutting the disc from a sheet can be accomplished so as to produce a disc having very exact dimensions both with respect to the diameter and roundness of the outside diameter and to the location of the central aligning hole on the axis of the disc. Finally, a disc formed by a cutting operation will have a sharp edge which is a desirable feature for the valve of the present invention.

The valve body and the valve retainer are made from materials that are non-deformable when compared to the material of the valve disc. Thus, the stiffer plastics such as polystyrenes, acetyls, nylons, polycarbonates, vinyls, etc. as well as metals are suitable. It is desirable that the valve seat be formed with accurate dimensions free of warpage.

Figure 6:
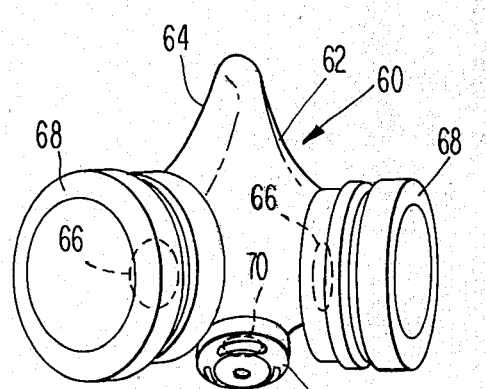
FIG. 6 represents a respirator making use of the present valve; and, FIG. 7 represents a gas mask making use of the present valve.

FIG. 6 depicts a respirator 60 for covering and protecting the nose and mouth of a wearer and to protect the wearer from injuring atmospheres. The respirator comprises a shell portion 62 having a circumferential seal 64 for sealing the shell portion to the face of the wearer. The shell portion shown has three apertures. Two apertures 66 located behind the filter holders 68, are inlet apertures permitting air to flow through the filters of 68 and into the shell when the wearer inhales. The third aperture 70 is an outlet aperture. A valve 72 of the invention is located adjacent to the outlet aperture 70 and prevents the wearer from inhaling unfiltered air. In alternate designs, additional valves may be located adjacent to the inlet apertures 66 to prevent exhaled air from passing back through the filter elements contained in the holders 68.

Figure 7:
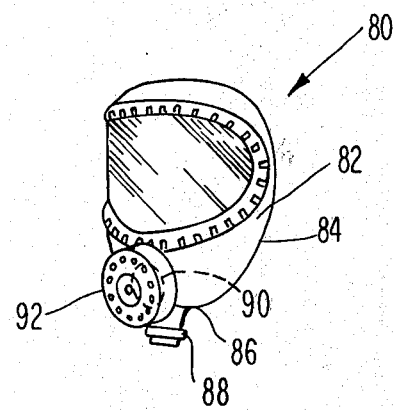

FIG. 7 depicts a gas mask 80 for covering and a protecting the nose, mouth and eyes of a wearer from injurious atmospheric environments. The mask includes a shell 82 having a circumferential seal 84 for sealing the shell to the face of a wearer. The shell shown has two apertures. A first inlet aperture 86 connects the gas mask to a protective cannister (not shown). A valve 88 of the invention is located adjacent to the aperture 86 and prevents exhaled air from passing back into the cannister. A second outlet aperture 90 connects the shell to exhalation valve 92 of the present invention. The exhalation valve 92 prevents the wearer from inhaling untreated air from his surroundings.

From this description, it can be seen that a novel valve for use with protective breathing and other apparatus has been described. Having fully disclosed my invention and given examples of its embodiment, I hereby claim:

1. A check valve assembly of the sort which is open when exposed to a forward air pressure and is closed when in a static condition and when exposed to a reverse air pressure, for use in a breathing apparatus which comprises:
   a. a valve body, the valve body being made of a non-deformable material, the valve body defining a valve seat, the valve seat including a flat ring shaped inner portion having a first outside diameter and a circular concavely shaped outer portion blending into the inner portion, the outer portion having a border, the border having a second diameter greater than the first diameter of the inner portion; and,
   b. a circular elastic valve disc made by cutting it from a flat sheet and having a face and a sharp edge, the diameter of the edge being greater than the first outside diameter of the inner portion of the valve seat and less than the second diameter of the outer portion border, the valve disc being located within the confines of the valve seat, and the axis of the valve disc being on the axis of the valve seat, so than when there is no pressure on the valve disc, the edge of the valve disc engages the concave outer portion of the valve seat in a line contact, with the remainder of the valve disc being free of contact with the flat inner portion of the valve seat, and when the valve disc is exposed to a reverse air pressure, the face of the valve disc engages the entire surface of the flat ring shaped inner portion of the valve seat.

2. A valve assembly for use in breathing apparatus which comprises:
   a. a valve body, the valve body being made of a non-deformable material, the valve body defining a valve seat, the valve seat including a flat ring shaped inner portion having a first outside diameter and a circular concavely shaped outer portion blending into the inner portion, the outer portion having a border, the border having a second diameter greater than the first diameter of the inner portion, the valve body further defining a valve support at the center of the valve seat, the surface of the valve support being a continuation of the flat inner portion of the valve seat, an aligning pin located on the axis of the seat and extending above the surface of the valve support, and openings in the inner portion to permit a flow of air therethrough;
   b. a circular elastic valve disc made by cutting it from a sheet and having a face and a sharp edge, the diameter of the edge being greater than the first outside diameter of the inner portion of the valve seat and less than the second diameter of the outer portion border, the valve disc defining at its center an opening, the opening being an engaging fit on the aligning pin of the valve body, the valve disc being located within the confines of the valve seat, the axis of the valve disc being on the axis of the valve seat, and the opening in the valve disc being located on the aligning pin;
   c. a valve retainer made of a non-deformable material, the retainer having a circular shape and an end, the diameter of the end of the retainer being less than the diameter of the inner portion of the valve seat, an opening defined in the end of the retainer on the axis thereof, the diameter of the opening being sufficient to accept the aligning pin of the seat member; and,
   d. means for positioning the valve retainer in relationship to the valve body such that the axis of the retainer is on the axis of the valve body and when the valve disc is located on the aligning pin of the valve body it is held between the end of the valve retainer and the valve support, the edge of the valve disc is in line contact with the outer portion of the valve seat, the portion of the valve disc held by the end of the valve retainer is in sealing contact with the valve support, and the remaining portions of the valve disc are free of contact with the valve seat.

3. A valve assembly as defined in claim 2 wherein the outer portion of the valve seat has the shape of a portion of a circular toroid and the inner portion of the seat is tangent to the inner portion of the toroidal shaped outer portion of the valve seat.

4. A valve assembly as defined in claim 2 wherein the edge of the valve disc is at right angles to the face of the valve.

5. In a protective breathing device for protecting a wearer from injurious atmospheric environments, the device including a shell portion, a means for sealing the shell portion to the face of the wearer, the shell further defining a plurality of apertures, the improvement which comprises:
   a. a valve body, the valve body being made of a non-deformable material, the valve body defining a valve seat, the valve seat including a flat ring shaped inner portion having a first outside diameter and a circular concavely shaped outer portion blending into the inner portion, the outer portion having a border, the border having a second diameter greater than the first diameter of the inner portion, the valve body further defining a valve support at the center of the valve seat, the surface of the valve support being a continuation of the flat inner portion of the valve seat, a aligning pin located on the axis of the seat and extending above the surface of the valve support, and openings in the inner portion to permit a flow of air therethrough;
   b. a circular elastic valve disc made by cutting it from a flat sheet and having a face and a sharp edge, the diameter of the edge being greater than the first outside diameter of the inner portion of the valve seat and less than the second diameter of the outer portion border, the valve disc defining at its center an opening, the opening being an engaging fit on the aligning pin of the valve body, the valve disc being located within the confines of the valve seat, the axis of the valve disc being on the axis of the valve seat, and the opening in the valve disc being located on the aligning pin;
   c. a valve retainer made of a non-deformable material, the retainer having a circular shape and an end, the diameter of the end of the retainer being less than the diameter of the inner portion of the valve seat, an opening defined in the end of the retainer on the axis thereof, the diameter of the opening being sufficient to accept the aligning pin of the seat member; and, d. means for positioning the valve retainer in relationship to the valve body such that the axis of the retainer is on the axis of the valve body and when the valve disc is located on the aligning pin of the valve body it is held between the end of the valve retainer and the valve support, the edge of the valve disc is in line contact with the outer portion of the valve seat, the portion of the valve disc held by the end of the valve retainer is in sealing contact with the valve support and the remaining portions of the valve disc are free of contact with the valve seat.

6. A protective breathing device as defined in claim 5 wherein the protective breathing device is a gas mask.

7. A protective breathing device as defined in claim 5 wherein the protective breathing device is a respirator.

* * * * *